(12) United States Patent
Whitworth et al.

(10) Patent No.: US 6,305,259 B1
(45) Date of Patent: Oct. 23, 2001

(54) LOG MERCHANDISER

(75) Inventors: Ronald Whitworth, Mission; Gian Pietro Infanti, Burnaby, both of (CA)

(73) Assignee: Flare International Sawmill Systems Ltd., Surrey (CA)

( * ) Notice: Subject to any disclaimer, the term of this patent is extended or adjusted under 35 U.S.C. 154(b) by 0 days.

(21) Appl. No.: 09/375,487

(22) Filed: Aug. 17, 1999

(51) Int. Cl.[7] ........................................ B27B 7/04
(52) U.S. Cl. .................... 83/23; 83/76.8; 83/113; 83/155; 83/365; 83/368
(58) Field of Search .................... 83/76.8, 76.9, 83/76.7, 75.5, 74, 156, 155, 365, 368, 240, 508.2, 454, 456, 490, 489, 508.3

(56) References Cited

U.S. PATENT DOCUMENTS

| | | | |
|---|---|---|---|
| 3,656,261 | * | 4/1972 | Everett ................................. 83/490 |
| 3,908,495 | * | 9/1975 | Bush, Jr. et al. .................... 83/155 |
| 4,031,788 | * | 6/1977 | Boge et al. ........................... 83/465 |
| 4,139,035 | * | 2/1979 | Bystedt et al. ..................... 144/312 |
| 4,330,019 | * | 5/1982 | Murphy et al. .................... 144/312 |
| 4,468,993 | | 9/1984 | McCown et al. . |
| 4,485,861 | * | 12/1984 | Nilsson ............................... 144/357 |
| 4,907,294 | * | 3/1990 | Bolton et al. .................. 364/474.09 |
| 4,977,805 | * | 12/1990 | Corley, III ........................... 83/76.8 |
| 5,201,258 | * | 4/1993 | Cremona .............................. 83/75.5 |
| 5,544,558 | * | 8/1996 | Hughes ................................ 83/75.5 |
| 5,579,671 | | 12/1996 | Bowlin . |
| 5,785,102 | * | 7/1998 | Hamel ................................. 144/387 |

* cited by examiner

Primary Examiner—Rinaldi I. Rada
Assistant Examiner—Kim Ngoc Tran
(74) Attorney, Agent, or Firm—Hall, Priddy, Myers & Vande Sande (57) ABSTRACT

An automatic log-cutting apparatus, or log merchandiser, which is designed to analyze and rapidly process tree-length stems, or logs, into shorter segments for further processing in pole mills, sawmills, plywood plants and the like. The logs are loaded via a conveyor onto the support arms of a number of cutting stations, all of which are movable and pre-positioned according to the determined optimum cut locations. The logs are then cut by pivoting saw blades, and the cut segments are released by the support arms onto a conveyor for removal.

6 Claims, 7 Drawing Sheets

LOG MERCHANDISER

FIELD

This invention relates to a method of scanning and cutting tree-length logs or stems, by means of an automatic log-cutting apparatus which is designed to rapidly process the logs into segments of optimum character—that is, segments of varying lengths such that maximum value is derived from each log.

BACKGROUND OF THE INVENTION

Traditional systems which have been developed for the purpose of achieving optimum value from a tree stem are often unnecessarily complex, thereby making them relatively expensive to both construct and maintain. In addition, traditional systems often suffer from slow processing and handling times, the times required to initially determine the optimum cut locations in the stem and subsequently perform those cuts to produce the optimum segments.

U.S. Pat. No. 4,468,993 issued Sep. 4, 1984 to McCown et al., discloses a small log bucking system where a log is scanned to obtain data to select cut locations. A computer selects cut locations based on the data obtained during the scan and shows the locations on the log through the use of lasers projected onto the log. An operator has the choice of accepting or rejecting the cut locations. If the cut locations are accepted then the operator issues the command to have the log brought into the cutting position. If the cut locations are rejected by the operator then the operator issues a command to alter the cut locations and the computer recalculates the cut locations and again projects them onto the log. If the cut locations are accepted then the operator issues the command to have the log brought into the cutting position otherwise the cut positions are altered once again. When the log has been brought into the cutting position by placement on the cutting bed, the log is clamped into place, the log cutting saws are moved to the cutting locations previously specified and the log is cut. This process is slow and unduly complex because it involves the use of only two saws and it requires an operator to verify each of the computer calculated cut locations before the log can be cut. Also, this process is slowed further as a result of the log cutting saws being moved only after the log has been placed in the cutting bed and the need to clamp the log. The number of cut locations is also limited as a log can not be cut in a location where there is a cutting bed support.

U.S. Pat. No. 5,579,671 issued Dec. 3, 1996 to Bowlin, discloses an automatic stem cutting apparatus comprising one fixed and multiple linearly adjustable saws. A log is scanned and the information from the scan is fed to a computer which in turn calculates the cut locations for the log. The adjustable saws are then positioned in accordance with the computer determined cut locations. A stem loader then transfers the log to the saw carriages. Once on the saw carriages, the log is positioned and clamped into place where it is then cut by the saws as the saw blades swing forward. The cut segments of the log are then pushed from the saw carriage by a segment ejector to fall to an output conveyor. This systems too suffers from slow processing time and unnecessary complexity. The handling time for a log is unnecessarily long and complex due to the use of the segment loader and segment ejectors. The system is also limited in that all the saws are not linearly adjustable.

It is, therefore, an object of this invention to provide an improved means of automatically scanning and cutting a log into segments of optimum value. A further object of the invention is to provide a log-cutting apparatus which is both less complex and requires less processing and handling time than other known systems, thereby allowing for greater cost effectiveness and efficiency.

SUMMARY OF THE INVENTION

These and other objects of the invention are provided in a new and improved log-cutting apparatus, or log merchandiser, which includes a loading apparatus and a plurality of movable, rail-mounted log-cutting assemblies with each assembly having two cradle arms and a log-cutting saw. The log-cutting assemblies can be positioned prior to the loading of a log. The pre-positioning of the log-cutting assemblies is achieved in accordance with scanning data, which yields the characteristics (e.g., length, diameter, location of knots, etc.) of the log, and with the aid of computer program information, which determines the optimum cut locations and positions the log-cutting assemblies accordingly.

A series of conveyors receive and transport a log to a log singulator which separates the logs to ensure only one log enters the saw gallery at a time. Once singulated, each log is passed to a second conveyor, where the log is scanned and the information fed to a computer which positions the log-cutting assemblies to achieve the optimum cuts. After scanning, the second conveyor transports the log onto the hydraulically-operated log-support arms, or cradle arms, of each log-cutting assembly. There is one cradle arm on either side of each log-cutting saw blade. Once a log is conveyed onto the cradle arms of the log-cutting assemblies, the saw blade of each of the log-cutting assemblies are pivoted down in concert to cut the log at the optimum locations. Each saw blade is located at one end of the log-cutting saw beam, which is pivotally connected to the log-cutting saw box. The log-cutting saw beam is pivoted by a hydraulic piston cylinder unit located at the opposite end of the log-cutting saw beam. Once the cuts are made, the cradle arms pivot down and away, dropping the cut segments onto the output conveyer for transport and further processing.

Other objects and advantages of the invention will become clear from the following detailed description of the preferred embodiment, which is presented by way of illustration only and without limiting the scope of the invention to the details thereof.

BRIEF DESCRIPTION OF THE DRAWINGS

The invention itself both as to organization and method of operation, as well as additional objects and advantages thereof, will become readily apparent from the following detailed description when read in connection with the accompanying drawings, wherein.

DETAILED DESCRIPTION OF THE PREFERRED EMBODIMENT

Figure 1:
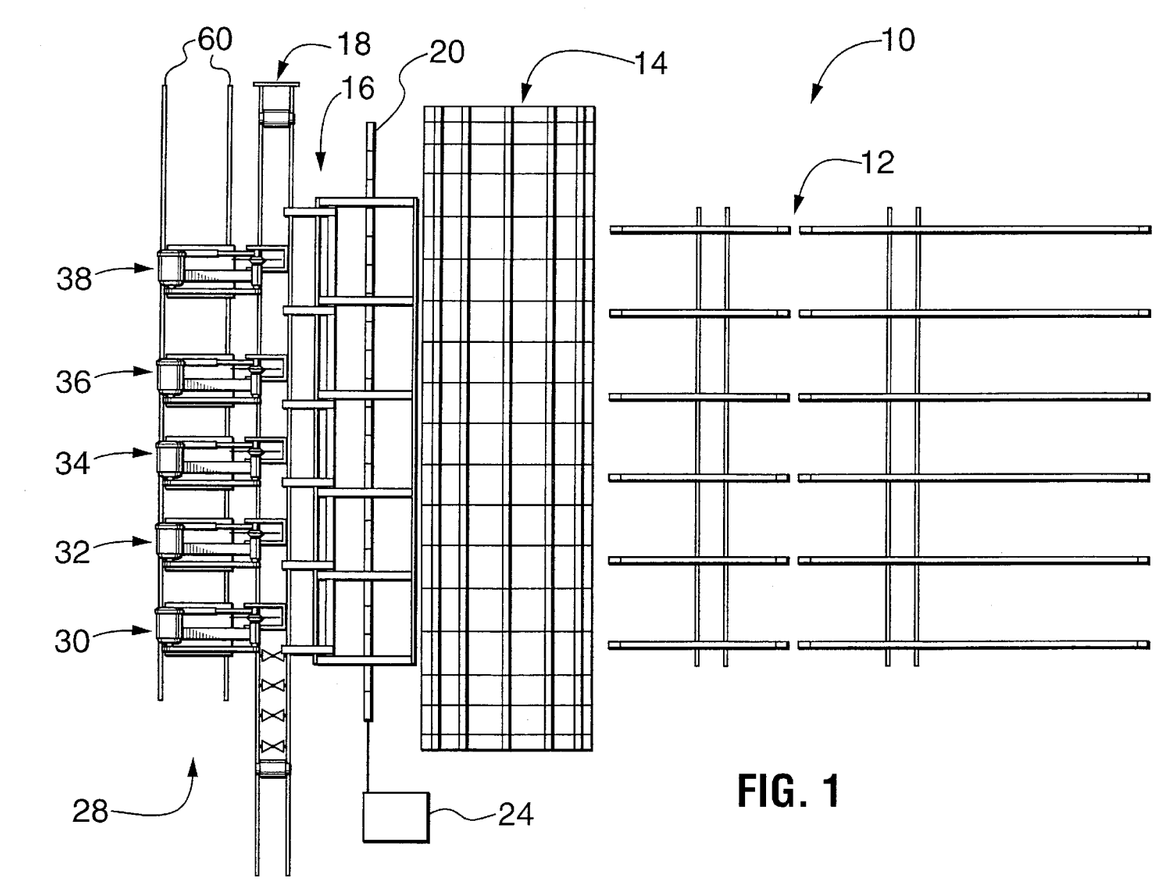
FIG. 1 is plan view of an embodiment of the log merchandiser.

Throughout the figures, like elements are indicated by like reference numbers. Referring to FIG. 1, the log merchandiser 10 is comprised of a plurality of conveyors 12, 16, and 18, a transverse scanning apparatus 20 and a plurality of log-cutting assemblies 30, 32, 34, 36, and 38. It is important to note that each of the conveyors 12, 16 and 18 may be comprised of a single conveyor or a plurality of conveyors used in series.

The first conveyor 12, transports the logs to the log singulator 14. The log singulator separates and singulates the incoming logs and prevents more than one log from being loaded onto the second conveyor 16. The log singulator 14 is any suitable log singulator which may be a conventional step feeder, quadrant feeder, log ladder or stop & loader, all of which are well known in the art. While each log is on the second conveyor 16, a transverse scanner 20 scans the log to determine its salient characteristics. The scanner 20 is any suitable scanner, which may be a conventional light curtain scanner or triangular scanner. The scanner records characteristics such as position, length, diameter, and etc. of the log. After a log is scanned, the scanner computing system 24 (shown as a box) calculates the optimum locations at which to cut the log and instructs the log-cutting assemblies 30, 32, 34, 36, and 38 to move to the appropriate positions along the saw assembly rails 60. All of the log cutting assemblies are laterally adjustable making it unnecessary to align the log with a preset log zero line. After scanning, the log is conveyed to the saw gallery 28. Once the log is in the saw gallery 28, the log is cut by log-cutting assemblies 30, 32, 34, 36, and 38. After cutting is complete, the log segments are all owed to drop onto output conveyor 18 for further processing.

Figure 2:
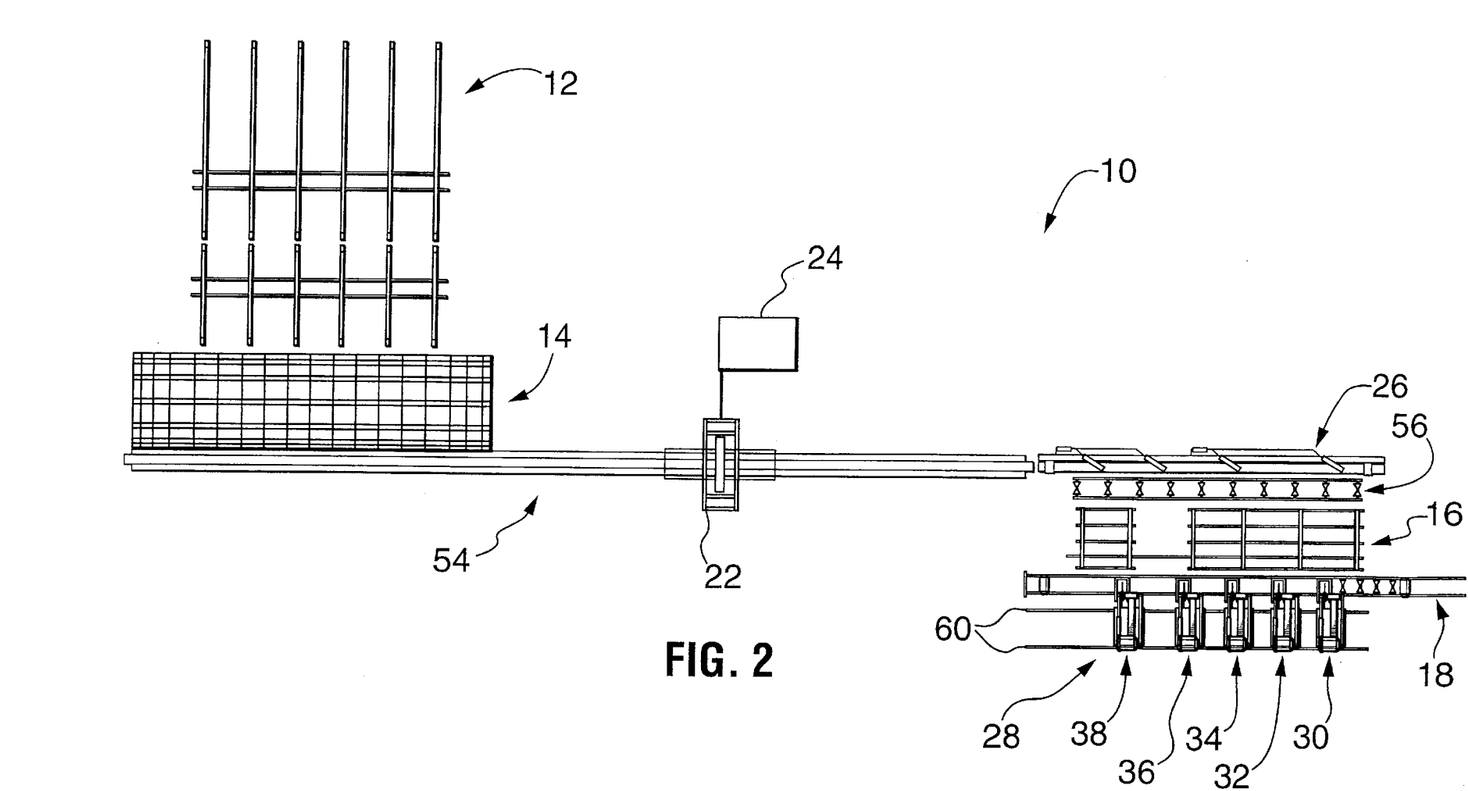
FIG. 2 is a plan view of an alternate embodiment of the log merchandiser.
Figure 3:
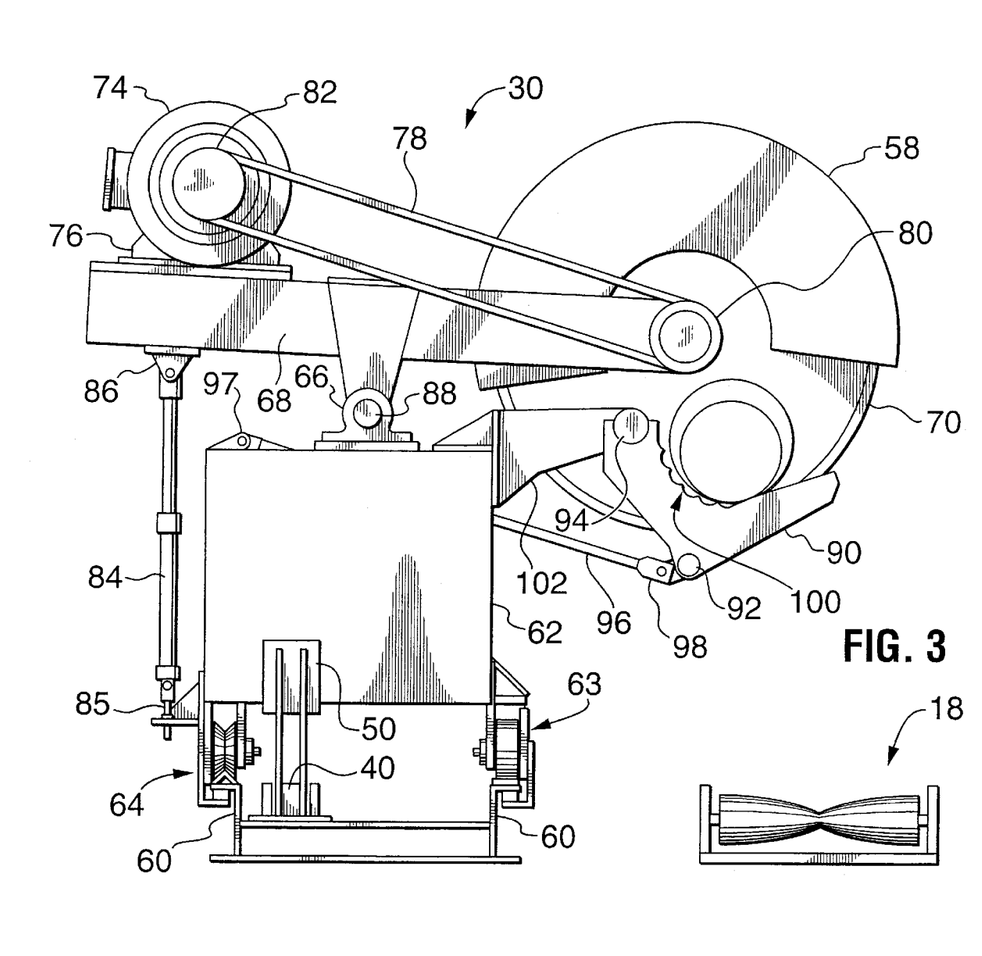
FIG. 3 is a side view of a log-cutting assembly in the pre-cutting position.
Figure 4:
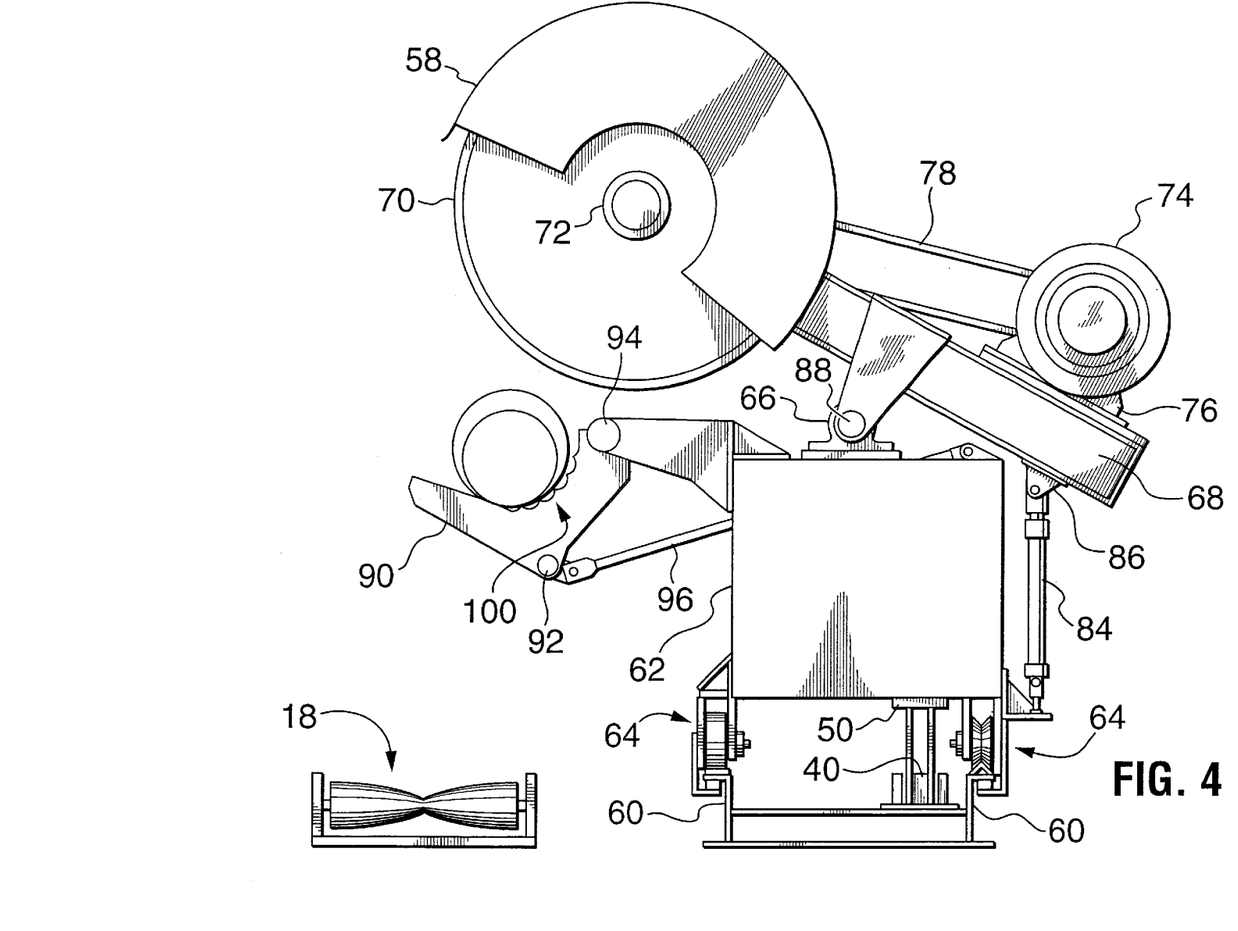
FIG. 4 is a side view of a log-cutting assembly showing the side opposite to that shown in FIG. 3.
Figure 5:
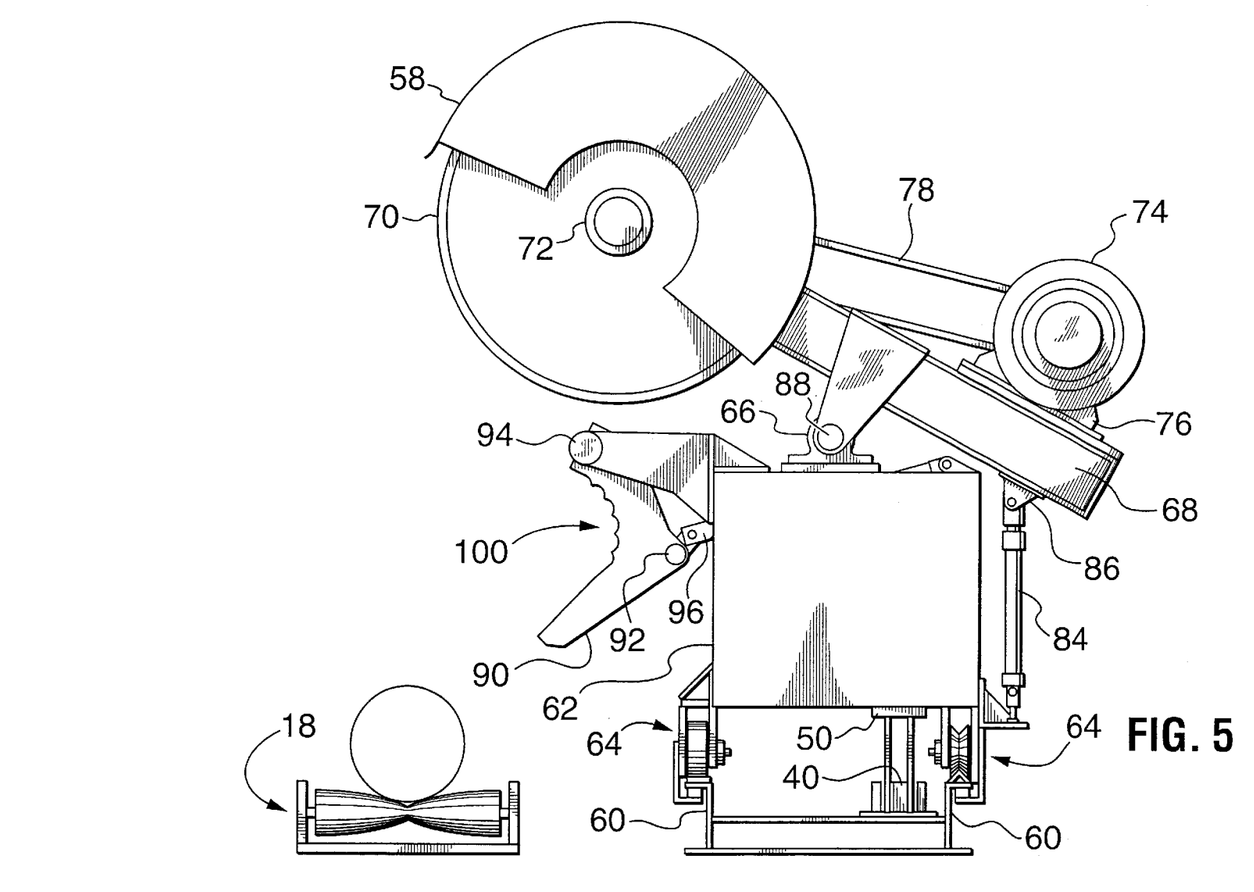
FIG. 5 is a side view of a log-cutting assembly in the post-cutting position.
Figure 6:
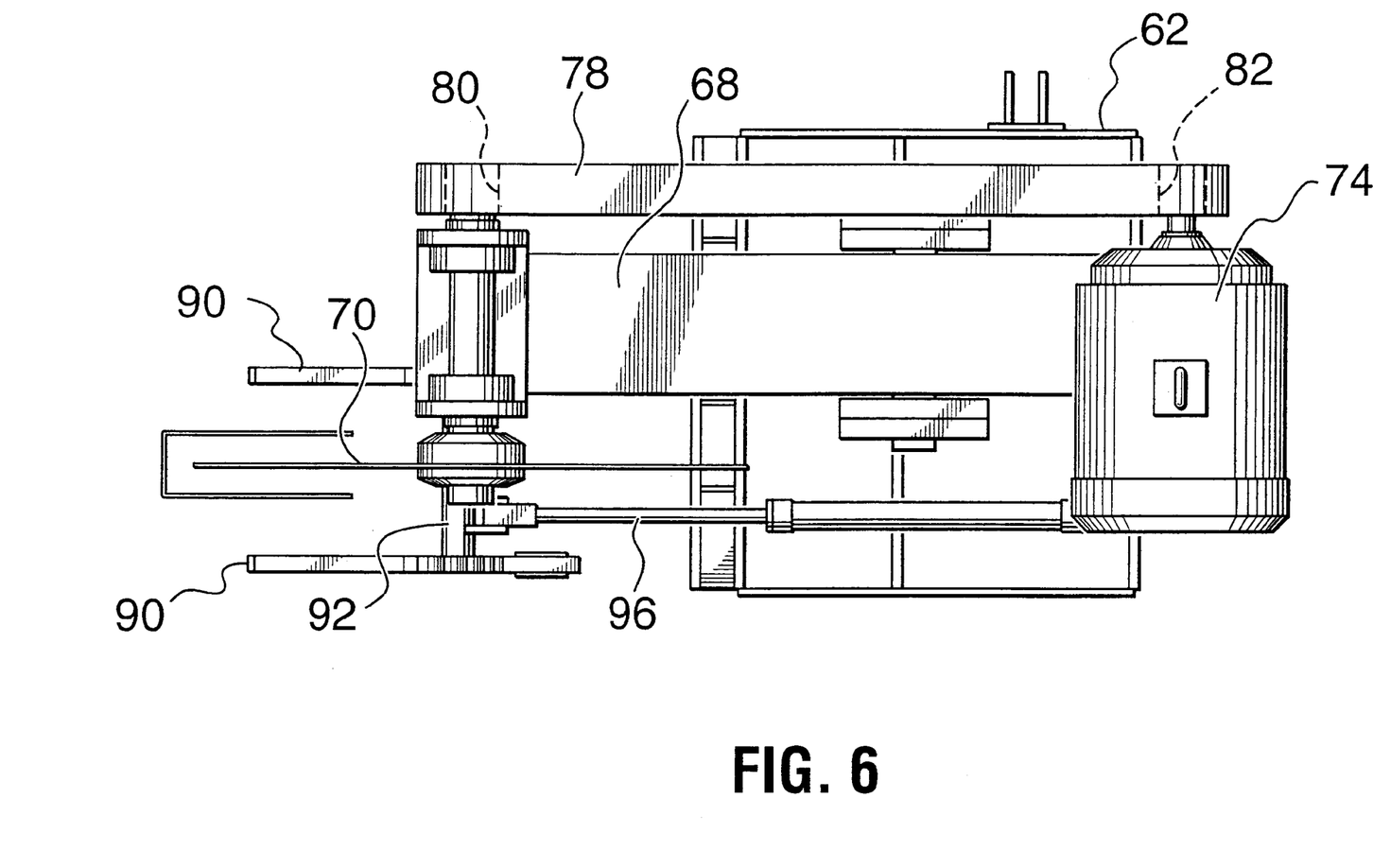
FIG. 6 is a plan view of a log-cutting assembly.
Figure 7:
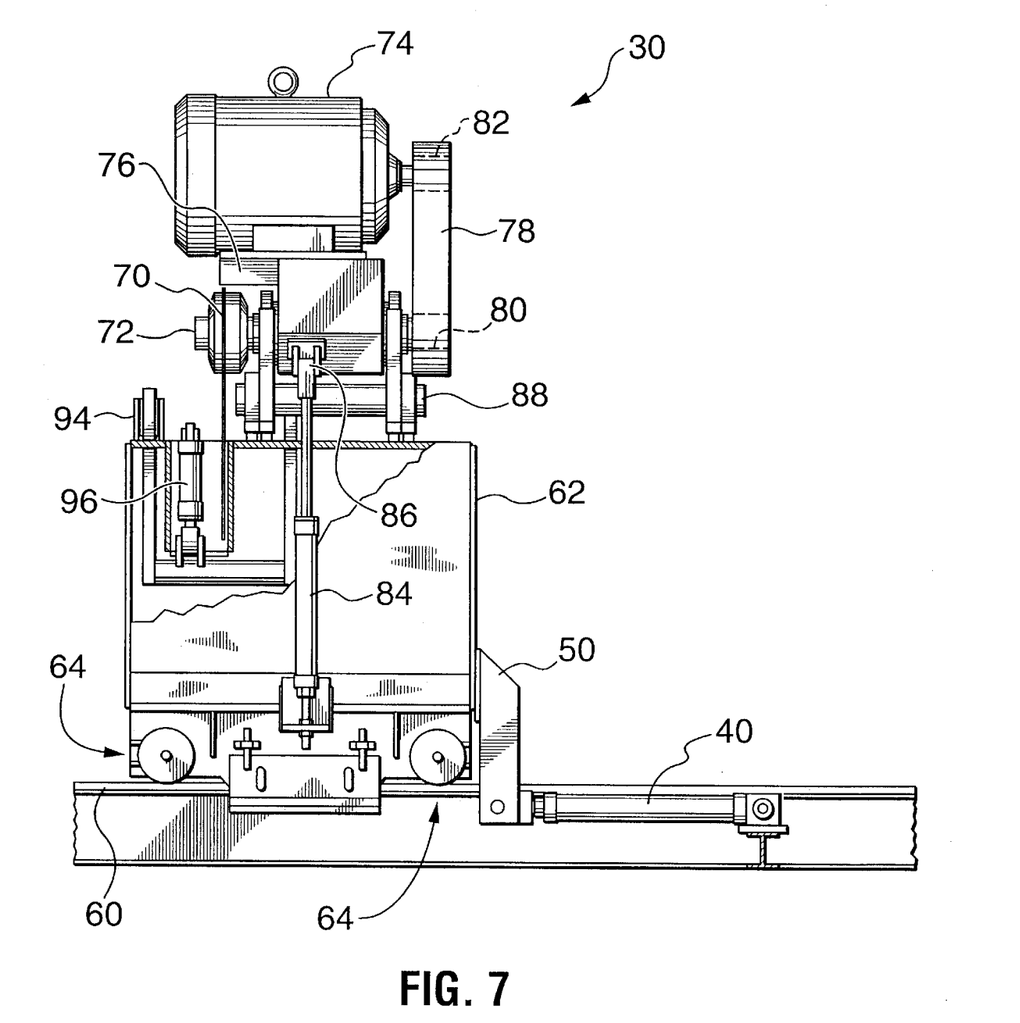
FIG. 7 is a back view of a log-cutting assembly.

Referring to FIG. 2, an alternate embodiment of the log merchandiser 10 is shown. The log merchandiser 10 of this embodiment is comprised of a plurality of conveyors 12, 16, 18, 54 and 56, a linear scanning apparatus 22 and a plurality of log-cutting assemblies 30, 32, 34, 36, and 38. As with the previous embodiment, each of the conveyors 12, 16, 18, 54 and 56 may be comprised of a single conveyor or a plurality of conveyors used in series.

The first conveyor 12, transports the logs to the log singulator 14. The log singulator separates and singulates the incoming logs and prevents more than one log from being loaded onto the linear conveyor 54. As each log is transported along the linear conveyor 54, a linear scanner 22 scans the log as it passes, to determine its salient characteristics. The scanner 22 is any suitable scanner, which may be a conventional light curtain scanner or triangular scanner. The scanner records characteristics such as position, length, diameter, and etc. of the log. After a log is scanned, the scanner computing system 24 (shown as a box) calculates the optimum locations at which to cut the log and instructs the log-cutting assemblies 30, 32, 34, 36, and 38 to move to the appropriate positions along the saw assembly rails 60. All of the log cutting assemblies are laterally adjustable making it unnecessary to align the log with a preset log zero line. After scanning, the log is conveyed to the log transfer assembly 26 which transfer the log from the linear conveyor 54 to a bi-directional conveyor 56 which positions the log prior to passing it to the second conveyor 16. As described earlier, the second conveyor 16 transports the log to the saw gallery 28. Again, once the log is in the saw gallery 28, the log is cut by log-cutting assemblies 30, 32, 34, 36, and 38. After cutting is complete, the log segments are allowed to drop onto output conveyor 18 for further processing.

As all of the log-cutting assemblies 30, 32, 34, 36, and 38 operate in the same manner, and are comprised of the same components, reference will only be made to a log-cutting assembly 30 to avoid unnecessary repetition. Referring now to FIGS. 3 to 7, alternate views of the log-cutting assembly 30 are shown. The log-cutting assembly 30 uses linear positioner 40 to travel along the saw assembly rails 60. The linear positioner 40 consists of a hydraulic cylinder and a digital probe (not shown) to locate the position of each linear positioner.

The first end of linear positioner 40 is secured to the log-cutting saw box 62 of log-cutting assembly 30 via the linear positioner mount 50. The second end of the linear positioner 40 is secured to the base of the saw gallery 28 between the rails 60 (see FIGS. 3, 4, 5, and 7). The linear positioner 40 is controlled by the scanner computer 24 via a programmable logic controller (not shown).

Movement of the log-cutting assembly 30 along the saw assembly rails 60 is facilitated by the wheel assemblies 63 and 64. The wheel assemblies 63 and 64 are mounted to the log-cutting saw box 62 at the front and rear, respectively.

The log-cutting saw beam 68 is mounted to the top of the log-cutting saw box 62 through the saw mount 66. The saw blade 70 is mounted at one end of the log-cutting saw beam 68 via the arbor assembly 80 and the saw motor 74 is mounted at the opposite end of the log-cutting saw beam 68 through the motor mount 76. The saw motor 74 rotates the saw blade 70 via the belt 78 which connects the saw motor sheave 82 to the saw blade sheave 80. The saw blade 70 is shielded by a saw guard 58. The log-cutting saw beam 68 reversibly pivots around pivot 88 between a log cutting position and a non-log cutting position. The log-cutting saw beam 68 is reversibly pivoted through the action of the hydraulic cylinder 84 which has one end mounted to log-cutting saw box through cylinder mount 85 and the second end pivotally mounted to the log-cutting saw beam 86 via pivoting cylinder mount 86.

Also the cradle arms 90 are mounted to log-cutting saw box 62 through the cradle supports 102. The cradle arms 90 are mounted on either side of the saw blade 70 and connected together via a cradle bar 92. The cradle bar 92 ensures that the cradle arms 90 move in unison. The cradle arms 90 are reversibly pivotal about the cradle pivots 94. A hydraulic cylinder 96 has one end pivotally mounted via a pivotal cylinder mount 97 and the other end mounted to the cradle bar 92 via a pivotal cylinder mount 98. The hydraulic cylinder 96 allows the cradle arms 90 to move from a log-cutting position that supports a log as it is being cut to a non-log-cutting position where the cradle arms 90 retract back towards the log-cutting saw box 62 and thereby release the cut log segments onto the output conveyor 18 (see FIG. 5). The log supporting portion of the cradle arms 90 have teeth 100 which prevent the log from spinning in (or out of) the cradle arms 90 when the saw blade 70 is lowered to cut the log.

In operation, the log merchandiser 10 cuts tree-length logs or stems into segments that maximize the value derived from each log as follows. Referring to FIGS. 1–7, logs are delivered to first conveyor 12 transversely, in a linear sequence. The logs are transported via first conveyor 12 to the log singulator 14. The log singulator 14 separates the incoming logs and allows only one log at a time onto the second conveyor 16 or the linear conveyor 54. The operation of the conveyors 12, 16, 18, 54 and the log singulator 16 are controlled by the scanner computer 24. From commands issued from the scanner computer 24, an incoming log is transported, scanned, cut and the cut portions transported for further processing. In one embodiment, the log is scanned as it rest on the second conveyor 16. In an alternate embodiment, the log is scanned as it passes by the scanner while being transported by the linear conveyor 54. The scanner 20 or 22, depending on the embodiment, scans the log to determine the physical characteristics of the log. The physical characteristics of the log, obtained by the scanner 20 or 22, are then transferred to the scanner computer 24. The scanner computer 24, based on the information obtained from scanner 20 or 22, calculates the optimum cut locations for the log. The scanner computer 24 then issues commands to the respective linear positioners of the log-cutting assemblies 30, 32, 34, 36, and 38. The linear positioners move the log-cutting assemblies 30, 32, 34, 36, and 38, linearly along the saw assembly rails 60 to the predetermined positions as calculated by the scanner computer 24. As the log-cutting assemblies 30, 32, 34, 36, and 38 are being positioned, the log travels to the saw gallery 28. Once the log arrives at the saw gallery 28, the log is delivered into the cradle arms 90. The teeth 100 of the cradle arms 90 prevent the log from rotating during the sawing operation. The log-cutting assemblies 30, 32, 34, 36, and 38 have been positioned to the optimum cut locations, prior to the log being delivered into the cradle arms 90. Once the log has been transferred into the cradle arms 90, the hydraulic cylinder 84, under the control of scanner computer 24, extends to pivot the log-cutting saw blade 70 of each of the log-cutting assemblies 30, 32, 34, 36, and 38 down to cut the log simultaneously at the optimum cut locations. After the cuts have been made, the hydraulic cylinder 96 retracts causing the cradle arms 90 to pivot down and towards the log-cutting saw box 62 thus allowing the cut segments of the log to fall onto the output conveyor 18. Output conveyor 18 then transports the cut segments of the log to be processed further.

It will be appreciated by those skilled in the art that the log merchandiser of this invention is distinguished by its versatility, simplicity, and efficiency. The transverse feed allows the log-cutting saws to all be adjusted before the log is loaded into the cradle arms 90, thereby avoiding the need to replace the cradle arms 90 with a more complex system to allow the log to be moved while the log is positioned on a saw bed for cutting, as in some other systems. Moreover, the design of the cradle precludes the need for a clamping system to hold the logs during sawing, a common feature of other log-cutting systems.

The conveyors are standard, commercially available conveyors available from a number of suppliers. These conveyors may be of variable length and number used in series to span the required distances. Furthermore, it will be understood that the motors, conveyors, linear positioners, saw blades, wheels, pivots, etc. used throughout this invention may be of any desired design according to the knowledge of those skilled in the art and operate in conventional fashion to achieve the intended result. Indeed, the hydraulic cylinders, including those motivating the log-cutting saw beams and cradles, may be replaced with electric or pneumatic equipment, if so desired.

It will also be acknowledged that any scanning or computing system may be used to construct a preferred embodiment of this invention and achieve the intended operation. And although not described above, it should be understood that the computing system controls the various elements of the log merchandiser via a system of programmable logic controllers (PLCs) or equivalent control devices, and that these may also be of any appropriate design.

Although the present invention has been described in detail with reference to one preferred embodiment thereof, it will be clearly understood that this is by way of illustration only. Many variations and alternative embodiments of the invention will now be apparent to those skilled in the art, and are not to be excluded from the scope of the invention, which is to be determined only by the appended claims, as set forth below.

What is claimed is:

1. A log-cutting apparatus for cutting a log into segments of optimal length, comprising:

(a) a scanning assembly operative to determine the characteristics of said log;

(b) a central processor operative to receive information regarding said characteristics of said log and generate cut position information and cut position signals;

(c) a transverse conveyor operative to transport said log in a direction transverse to a longitudinal axis of said log;

(d) a guide track assembly; and (e) a plurality of log-cutting assemblies, each of said log-cutting assemblies independently moveably mounted onto said guide track assembly and comprising:

(i) a saw box;

(ii) a saw assembly pivotally mounted to said saw box to saw said log;

(iii) a cradle assembly pivotally mounted to said saw box adjacent said saw assembly and operative to receive said log from said transverse conveyor and to support said log for cutting; and (iv) a drive means coupled to said saw box responsive to cut position signals from said central processor, said drive means operative to reversibly move together said saw box, said saw assembly and said cradle assembly along said guide track assembly in a direction parallel to a longitudinal axis of said log to a position determined by said cut position information;

wherein each of said log-cutting assemblies is independently and reversibly positionable.

2. The log-cutting apparatus according to claim 1, wherein said drive means includes a hydraulic cylinder and a probe.

3. The log-cutting apparatus according to claim 1, wherein said cradle assemblies each comprise a pair of cradle arms and an actuator, a first cradle arm of said pair of cradle arms is pivotally mounted to a first side of a corresponding saw box, a second cradle arm of said pair of cradle arms is pivotally mounted to a second side of a corresponding saw box and said actuator capable of reversibly pivoting said pair of cradle arms between a log supporting position and a log releasing position.

4. The log-cutting apparatus according to claim 3 wherein said cradle arms have teeth to prevent said log from spinning during cutting.

5. The log-cutting apparatus according to claim 1, wherein said saw assembly comprises a saw beam pivotally mounted on the top of said saw box having a saw blade at a first end of said saw beam such that when said saw beam is pivoted, said saw blade comes into cutting engagement with said log.

6. A method of cutting a log into segments of optimal length, comprising:

(a) scanning a log to determine characteristics of said log;

(b) generating cut position information based on said characteristics of said log;

(c) positioning a plurality of log-cutting assemblies and respective cradle assemblies such that each log-cutting assembly and associated cradle assembly move together in response to the cut position information;

(d) providing a transverse conveyor;

(e) moving said log transversely along said transverse conveyor onto said cradle assemblies;

(f) cutting said log into segments with said log-cutting assemblies; and (g) releasing said segments from said cradle assemblies causing said segments to fall in a direction down and away from said log-cutting assemblies.

* * * * *